US012791074B2

(12) United States Patent
Geisen et al.

(10) Patent No.: US 12,791,074 B2
(45) Date of Patent: Nov. 10, 2026

(54) BUSH

(71) Applicant: DN Automotive Germany GmbH, Mendig (DE)

(72) Inventors: Jan Geisen, Mendig (DE); Robin Pauly, Mendig (DE); Michaela Sommer, Nentershausen (DE); Christoph Ruland, Mendig (DE); Jonathan Morton, Mayen (DE)

(73) Assignee: DN Automotive Germany GmbH, Mendig (DE)

( * ) Notice: Subject to any disclaimer, the term of this patent is extended or adjusted under 35 U.S.C. 154(b) by 0 days.

(21) Appl. No.: 19/100,509

(22) PCT Filed: Jul. 18, 2023

(86) PCT No.: PCT/EP2023/069874
§ 371 (c)(1),
(2) Date: Jan. 31, 2025

(87) PCT Pub. No.: WO2024/028097
PCT Pub. Date: Feb. 8, 2024

(65) Prior Publication Data

US 2025/0257777 A1 Aug. 14, 2025

(30) Foreign Application Priority Data

Aug. 5, 2022 (GB) ..................................... 2211449

(51) Int. Cl.
*F16F 1/376* (2006.01)
*F16F 1/38* (2006.01)

(52) U.S. Cl.
CPC ............ *F16F 1/3842* (2013.01); *F16F 1/376* (2013.01); *F16F 1/3863* (2013.01)

(58) Field of Classification Search
CPC ..................................................... F16F 1/3842
See application file for complete search history.

(56) References Cited

U.S. PATENT DOCUMENTS

| | | | |
|---|---|---|---|
| 4,491,429 | A | 1/1985 | Matoba |
| 2003/0001323 | A1 | 1/2003 | Hettler |
| 2008/0031730 | A1 | 2/2008 | Houradou |

FOREIGN PATENT DOCUMENTS

| | | | |
|---|---|---|---|
| EP | 0506053 | A1 | 9/1992 |
| EP | 0915266 | A1 | 5/1999 |

(Continued)

OTHER PUBLICATIONS

UK Search Report from Corresponding Application No. GB2211449.9 Jan. 30, 2023.

(Continued)

*Primary Examiner* — Melody M Burch
(74) *Attorney, Agent, or Firm* — McGarry Bair PC

(57) ABSTRACT

There is provided a bush for resisting vibrations between two components, such as the engine and chassis of a vehicle and which can be inserted into a housing. In an embodiment, the bush comprises an outer anchor part having a tubular sidewall defining a bore; an inner anchor part within the bore; a first resilient portion extending between the outer anchor part and the inner anchor part and operably engaged with the outer anchor part and the inner anchor part to isolate vibrations therebetween; a second resilient portion positioned on an outer surface of the sidewall and configured in use to contact the housing; an intermediate resilient portion interposed between the first and second resilient portions, wherein the outer anchor part comprises an aperture extending through the sidewall, and the intermediate resilient portion extends through the aperture.

20 Claims, 7 Drawing Sheets

(56) References Cited

FOREIGN PATENT DOCUMENTS

| | | | | |
|---|---|---|---|---|
| EP | 1270987 | A2 | | 1/2003 |
| EP | 1870600 | A1 | | 12/2007 |
| GB | 2202923 | A | | 10/1988 |
| GB | 2364558 | A | | 1/2002 |
| JP | H074457 | A | | 1/1995 |
| JP | H08233008 | A | * | 9/1996 |
| JP | H10318312 | A | * | 12/1998 |
| JP | 2010084807 | A | * | 4/2010 |
| JP | 2014145471 | A | * | 8/2014 |
| JP | 6059996 | B2 | | 1/2017 |
| WO | 2019197294 | A1 | | 10/2019 |
| WO | 2020070069 | A1 | | 4/2020 |

OTHER PUBLICATIONS

International Search Report from Corresponding Application No. PCT/EP2023/069874 Oct. 27, 2023.

* cited by examiner

BUSH

CROSS-REFERENCE TO RELATED APPLICATIONS

This application is a National Phase of International Application No. PCT/EP2023/069874, filed Jul. 18, 2023, which claims the benefit of British Application 2211449.0, filed Aug. 5, 2022, both of which are incorporated by reference herein in their entireties.

TECHNICAL FIELD

The invention relates to a bush for resisting vibrations between two components, such as the engine and chassis of a vehicle.

BACKGROUND

Typically a bush for resisting vibration comprises two anchor parts that are connected by resilient material, such as rubber. One anchor part is attached to one component of the vibrating machinery, and the other anchor part attached to another component. As the two components vibrate relative to each other, the resilient material provides isolation between vibrating component and the other component. Such bushes thus permit some relative movement, but act to prevent excessive movement between components.

GB 2 364 558 discloses an example of a bush, in which the anchor part for one component of the vibrating machinery is in the form of a hollow sleeve and the other anchor part in the form of a rod or tube extending approximately centrally and coaxially of the sleeve. A resilient body, e.g. of rubber or other suitable elastomeric material, is disposed within an annular volume between the sleeve and the rod. The resilient body can be secured in place, e.g. via (chemical) bonding or by radial crimping of the sleeve towards the rod.

The resilient body between the sleeve and the rod represents a spring element for isolating vibration. The dynamic stiffness of this spring element varies with vibration frequency depending on a number of factors, including the resilient material used, and the shape and configuration of the connection between the sleeve and rod. However, in any given arrangement, the resilient body will exhibit one or more eigenmodes where the dynamic stiffness increases and the vibrational isolation between the interconnected components is reduced.

It is desirable for dynamic stiffness increases due to eigenmodes of the resilient body to be reduced within a frequency range associated with normal operation of the two components to be interconnected (e.g. engine and chassis in a vehicle).

As set out above, one anchor part i.e. an outer anchor part, may be in the form of a hollow sleeve through which the other anchor part extends. This hollow sleeve may be inserted into a housing of one component of the vibrating machinery (e.g. chassis in a vehicle). In some examples, the outer anchor part may be made from plastic.

To ensure the bush is held securely in the housing, it is desirable to have a radially outward acting force ("pushout force") applied to the housing by the bush which may be achieved by an interference fit between the anchor of the bush and the housing.

The present invention has been devised in light of the above considerations.

SUMMARY

At its most general, the present disclosure relates to a bush for inserting into a housing, wherein the bush comprises an aperture in a tubular sidewall of an outer anchor part.

In a first aspect there is provided a bush for inserting into a housing, the bush comprising: an outer anchor part having a tubular sidewall defining a bore; an inner anchor part within the bore; a first resilient portion extending between the outer anchor part and the inner anchor part and operably engaged with the outer anchor part and the inner anchor part to isolate vibrations therebetween; a second resilient portion positioned on an outer surface of the sidewall and configured in use to contact the housing; an intermediate resilient portion interposed between the first and second resilient portions, wherein the outer anchor part comprises an aperture extending through the sidewall, and the intermediate resilient portion extends through the aperture.

By providing an aperture extending through the sidewall of the outer anchor part, the second resilient portion on the outer surface of the sidewall may be manufactured by passing a resilient material between the inner and outer anchor parts and through the aperture to the outer surface of the outer anchor part. This may improve the manufacturability of the bush and in particular the formation of the second resilient material on the outer surface of the bush i.e. outer anchor part, may be improved compared to moulding the second resilient material directly onto the outer surface. For instance, this structure facilitates formation of integrally formed first, second and intermediate resilient portions. Further, advantages of this structure are not limited to integral formation of the first, second and intermediate resilient portions. For example, the formation of the second resilient portion alone may be improved since the resilient material may flow into position via the aperture, i.e., from inside the outer anchor (e.g., from behind). In this way, it may be easier to avoid rubber flashing as it is possible to provide a more reliable stop on the outer surface of the outer anchor part.

By providing the second resilient portion on an outer surface of the sidewall of the outer anchor, movement of the bush in service may be reduced and the second resilient portion may assist in securely holding the bush in the housing. The second resilient portion described above assists with providing a push-out force. With some prior art bushes, there is a risk of the bush moving (e.g., axially within the housing) when in service, for example, due to the plastic hollow sleeve outer part setting over time due to heat. According to the present aspect, this risk is mitigated since the second resilient portion fills the gap created by this setting.

The bush comprises a first end and a second end opposite the first end. A longitudinal axis may extend between the first end and the second end. A longitudinal direction may be defined along the longitudinal axis. A radial direction may be defined as a direction substantially perpendicular to the longitudinal axis. The first end may be configured to be inserted first into the housing. For example, the first end may comprise a chamfer e.g. the outer anchor part may comprise a chamfer at the first end.

The second resilient portion is positioned on an outer surface of the sidewall of the outer anchor part. In other words, the second resilient portion is positioned on a surface of the sidewall which faces away from the inner anchor part i.e. a radially outer surface.

The second resilient portion is configured in use to contact the housing. In other words, the second resilient portion is configured to contact the housing in use, for example, when the bush is (being) inserted into the housing and/or after the bush is inserted into the housing.

The second resilient portion may protrude above (e.g. in a radial direction) some or all of the outer surface of the sidewall of the outer anchor part. For example, the second resilient portion may have a protruding portion which protrudes above (e.g. in a radial direction) some or all of the outer surface of the sidewall and which is configured in use to contact the housing. The second resilient portion e.g. the protruding portion, may have a first radial height which is greater than a radial height of the outer surface of the sidewall of the outer anchor part e.g. a maximum radial height of the outer surface. This maximum may be global, that is, a maximum considering the entire bush, or local, that is, a maximum considering only the portion (e.g. half, third or quarter) of the bush in which the second radial portion e.g. the protruding portion, is located. The radial heights herein may be measured from the longitudinal axis.

The second resilient portion e.g. the protruding portion, may protrude above the outer surface of the outer anchor part e.g. the maximum radial extent of the outer surface, in the radial direction by between 0.3 mm and 1.5 mm e.g. between, 0.35 mm and 1.4 mm, e.g. between 0.4 mm and 1.3 mm, e.g. between 0.45 mm and 1.2 mm e.g. between 0.5 mm and 1.1 mm e.g. between 0.55 mm and 1 mm e.g. between 0.6 mm and 0.9 mm e.g. between 0.65 mm and 0.8 mm e.g. between 0.7 mm and 0.75 mm, preferably by about 0.75 mm.

One or more of the first resilient portion, the second resilient portion and the intermediate resilient portion may be moulded e.g. injection moulded, onto the bush.

The first resilient portion may comprise a first resilient material e.g. rubber such as natural rubber or synthetic rubber (e.g. ethylene propylene diene monomer rubber (EPDM)). The second resilient portion may comprise a second resilient material e.g. rubber such as natural rubber or synthetic rubber (e.g. EPDM). The intermediate resilient portion may comprise a third resilient material e.g. rubber such as natural rubber or synthetic rubber (e.g. EPDM).

The first resilient material may have a Shore A hardness of between 40 and 58, e.g. between 42 and 56 e.g. between 44 and 54 e.g. between 44 and 52, e.g. between 44 and 50, e.g. between 44 and 48, preferably about 45.

The second resilient material may have a Shore A hardness of between 40 and 58, e.g. between 42 and 56 e.g. between 44 and 54 e.g. between 44 and 52, e.g. between 44 and 50, e.g. between 44 and 48, preferably about 45.

The third resilient material may have a Shore A hardness of between 40 and 58, e.g. between 42 and 56 e.g. between 44 and 54 e.g. between 44 and 52, e.g. between 44 and 50, e.g. between 44 and 48, preferably about 45.

In some embodiments, the first resilient material may be the same material as the second resilient material and/or the third resilient material. In some embodiments, the second resilient material may be the same as the third material. For example, the first resilient material, the second resilient material and the third resilient material may be the same material.

The intermediate resilient portion may be directly connected to the first resilient portion. The intermediate resilient portion may be directly connected to the second resilient portion. In other words, the intermediate resilient portion may be directly connected to the first resilient portion and/or the second resilient portion.

The first resilient portion, the second resilient portion and the intermediate resilient portion may be distinct components. For example, the first resilient portion, the second resilient portion and the intermediate resilient portion may be inserted or moulded on the bush in separate manufacturing steps. In some embodiments, the first resilient portion may be integrally formed with the intermediate resilient portion. In some embodiments, the second resilient portion may be integrally formed with the intermediate resilient portion. The first resilient portion, the second resilient portion and the intermediate resilient portion may be integrally formed. In other words, the first resilient portion, the second resilient portion and the intermediate resilient portion may form a single piece e.g. a continuous or unitary piece, of resilient material.

By providing a bush wherein the first resilient portion, the second resilient portion and the intermediate resilient portion are integrally formed, the first resilient portion, the second resilient portion and the intermediate resilient portion may be manufactured in a single step. For example, a resilient material may be injected into the bush between the outer anchor part and the inner anchor part to form the first resilient portion, the intermediate resilient portion, and the second resilient portion, for example, in that order. Accordingly, the manufacturability of the bush may be improved and simplified resulting in a reduction of cost and time.

The outer anchor part may be a hollow sleeve. The inner anchor part may be a rod or tube extending approximately centrally and coaxially of the sleeve. The first resilient portion may be disposed within a volume between the sleeve and rod. Whilst both the outer and inner anchor parts may be generally circular in cross-section, in some embodiments, one or both of the outer and inner anchor parts may have a non-circular cross section, for example, a cross-section having: a square shape, a rounded square shape, an octagonal shape, and the like. In an embodiment, the tubular sidewall of the outer anchor part has an annular cross-section such that it defines the bore i.e. an annular cross-section transverse to the longitudinal axis. The bore may extend the entire length of the outer anchor part in the longitudinal direction. The bore may have a bore diameter. In some embodiments, the bore diameter may be substantially uniform along the outer anchor part i.e. along the longitudinal axis of the bush. In some embodiments, the bore diameter may vary along the outer anchor part i.e. along the longitudinal length of the bush. The bore diameter may be between 30 mm and 110 mm e.g. between 40 mm and 100 mm e.g. between 50 mm and 90 mm e.g. between 60 mm and 80 mm. The outer anchor may have an exterior diameter of between 40 mm and 120 mm e.g. between 50 mm and 110 mm e.g. between 60 mm and 100 mm e.g. between 70 mm and 90 mm e.g. between 80 mm and 90 mm, preferably the exterior diameter is about 100 mm. The bush e.g. the outer anchor part, may have a length in a longitudinal direction of between 50 mm and 120 mm e.g. between 60 mm and 110 mm e.g. between 70 mm and 100 mm e.g. between 80 mm and 90 mm, preferably about 80 mm. The bush may be suitable for use in an electric vehicle (EV).

The outer anchor part may be substantially cylindrical. For example, the tubular side wall may be a substantially cylindrical tubular side wall. The bore of the outer anchor part may be substantially cylindrical. In other words, the tubular sidewall may have a substantially circular cross-section transverse to the longitudinal axis. In other embodiments, the outer anchor part may have another shape e.g. the tubular sidewall may have a non-circular cross-section transverse to the longitudinal axis. For example, the tubular sidewall may have a substantially ovular cross-section transverse to the longitudinal axis.

The second resilient portion may extend around a perimeter of the outer anchor part. For example, the second resilient portion may extend around the entire perimeter of the outer anchor part or may extend around only a part of the perimeter. In embodiments wherein the outer anchor part is substantially cylindrical, the second resilient portion may extend circumferentially around the outer anchor part e.g. fully or partially circumferentially around the outer anchor part.

By providing a second resilient portion which extends (e.g. entirely) around the perimeter of the outer anchor part, the engagement of the bush with the housing may be improved. Further the bush may self-centre in the housing during insertion of the bush into the housing when the second resilient portion extends fully around the perimeter of the outer anchor part. Moreover, tolerances required between the bush and the housing need not be as tight when the second resilient portion extends fully or entirely around the perimeter of the outer anchor part because the second resilient material of the second resilient portion "takes up" any discrepancy in tolerances.

The aperture in the sidewall extends from an inner (e.g. radially inner) surface of the sidewall to the outer (e.g. radially outer) surface of the sidewall. The aperture may extend in a substantially radial direction i.e. in a direction substantially perpendicular to the longitudinal axis of the bush. In an embodiment, the aperture may extend between a radially innermost surface and a radially outermost surface, but in some other embodiments, the aperture may not extend as far as the radially innermost surface and/or radially outermost surface. The aperture may be a hole i.e. a circular hole. The aperture may be a through hole in the sidewall, for example, through a thickness of the sidewall. The aperture may define a second bore of the bush, wherein the second bore is in fluid communication with the aforementioned first bore defined by the tubular shape of the sidewall. In an embodiment, the second bore may be substantially perpendicular to the first bore. The aperture may have a diameter of between 2 mm and 15 mm e.g. between 3 mm and 13 mm e.g. between 4 mm and 11 mm e.g. between 5 mm and 9 mm e.g. between 6 mm and 7 mm. In some embodiments, the aperture may be a slot having a slot width and a slot length. The slot width may be between 1 mm and 4 mm e.g. between 2 mm and 3 mm, preferably 2.5 mm. The slot length may be between 2 mm and 15 mm e.g. between 4 mm and 12 mm e.g. between 6 mm and 10 mm, preferably 8 mm.

The outer surface of the sidewall may comprise a perimetrical groove e.g. a circumferential groove. The perimetrical groove e.g. the circumferential groove may comprise the aperture. The perimetrical groove e.g. the circumferential groove, may extend partially or fully around the perimeter e.g. the circumference, of the outer anchor part. In an embodiment, the aperture may be formed in a radially innermost portion of the groove.

By providing a perimetrical groove e.g. a circumferential groove, the formation of the second resilient portion on the outer surface of the sidewall may be improved. In particular, during moulding, the second resilient material which forms the second resilient member may be more easily distributed around the circumference of the outer anchor part.

The perimetrical groove may comprise a step. In other words, a first portion of the perimetrical groove may be recessed from the outer surface of the sidewall by a first radial depth and a second portion of the perimetrical groove may be recessed from the outer surface of the sidewall by a second radial depth. The first radial depth may be greater than the second radial depth.

The first portion and/or the second portion of the perimetrical groove may extend partially or fully around the perimeter e.g. the circumference, of the outer anchor part. The first portion of the perimetrical groove may be towards the second end of the bush e.g. between the second portion of the perimetrical groove and the second end of the bush. The second portion of the perimetrical groove may be towards the first end of the bush e.g. between the first portion of the perimetrical groove and the first end of the bush.

The aperture in the sidewall may extend between an inner (e.g. radially inner) surface of the sidewall to an outer surface (e.g. radially outer surface) of the first radial portion. The aperture in the sidewall may be in fluid communication with the perimetrical groove e.g. the aperture may be in fluid communication with the first portion of the perimetrical groove (e.g., the aperture may open into an innermost surface of the first portion).

The perimetrical groove may have a length in the longitudinal direction of between 2 mm and 12 mm e.g. between 2 mm and 10 mm e.g. between 2 mm and 8 mm e.g. between 4 mm and 6 mm. The perimetrical groove may have a radial depth of between 1 mm and 15 mm e.g. between 2 mm and 12 mm e.g. between 3 mm and 10 mm e.g. between 4 mm and 8 mm e.g. between 5 mm and 6 mm, preferably 5 mm. The first portion of the perimetrical groove may have a length in the longitudinal direction of between 1 mm and 8 mm e.g. between 2 mm and 6 mm e.g. between 3 mm and 4 mm and may have first radial depth of between 2 mm and 6 mm e.g. between 3 mm and 5 mm e.g. about 4 mm. The second portion of the perimetrical groove may have a length in the longitudinal direction of between 1 mm and 8 mm e.g. between 2 mm and 6 mm e.g. between 3 mm and 4 mm and may have a second radial depth of between 0.5 mm and 5 mm e.g. between 1 mm and 4 mm e.g. between 2 mm and 3 mm.

The bush may comprise a plurality of intermediate resilient portions interposed between the first resilient portion and the second resilient portion. The outer anchor may comprise a plurality of apertures extending through the sidewall. In some embodiments, each of the plurality of intermediate resilient portions extends through a corresponding (i.e. different) one of the plurality of apertures.

Each of the plurality of apertures may be the same as the aperture described above. For example, each of the plurality of apertures may extend in a substantially radial direction. Further, the perimetrical groove may comprise the plurality of apertures.

Each of the plurality of intermediate resilient portions may be the same as the intermediate resilient portion described above. For example, each of the plurality of intermediate resilient portions may be directly connected to one of or both of the first and second resilient portions. Similarly, each of the plurality of intermediate resilient portions may be distinct components from the first resilient portion and the second resilient portion.

The plurality of intermediate resilient portions may each comprise the third resilient material e.g. rubber. Alternatively, one or more of the plurality of intermediate resilient portions may comprise a different resilient material from one or more others of the plurality of intermediate resilient portions.

One or more of the plurality of intermediate resilient portions may be integrally formed with the first resilient portion and/or the second resilient portion. In some embodiments, the first resilient portion, the second resilient portion and the plurality of intermediate resilient portions are integrally formed. In other words, the first resilient portion, the second resilient portion and the plurality of intermediate resilient portions may form a single piece e.g. a continuous or unitary piece, of resilient material.

By providing a bush wherein the first resilient portion, the second resilient portion and the plurality of intermediate resilient portions are integrally formed, the formation of the second resilient portion around the perimeter of the outer anchor may be improved. In particular, where a resilient material is injection moulded into the bush, the flow of material to the outer surface of the sidewall may be improved. Further, the time and cost of manufacturing may be reduced. Accordingly, the manufacturability of the bush may be improved and simplified.

The plurality of apertures may comprise between 2 and 8 apertures, more preferably between 3 and 6 apertures, for example 4 apertures. There may be more than 8 apertures.

The plurality of intermediate resilient portions may comprise a corresponding number of intermediate resilient portions. For example there may be between 2 and 8 intermediate resilient portions, more preferably between 3 and 6 intermediate resilient portions, for example 4 intermediate resilient portions. There may be more than 8 intermediate resilient portions.

The plurality of apertures may be substantially evenly or uniformly spaced around the perimeter e.g. circumference, of the outer anchor part. Accordingly, the corresponding plurality of intermediate resilient portions may be substantially evenly spaced around the perimeter e.g. circumference, of the outer anchor part. For example, in embodiments having 4 apertures, each aperture may be perimetrically (e.g. circumferentially) spaced by about 90 degrees (when viewed from the first end of the bush). Accordingly, the corresponding plurality of intermediate resilient portions, in this example, would be perimetrically (e.g. circumferentially) spaced by about 90 degrees (when viewed from the first end of the bush).

The second resilient portion e.g. the protruding portion, may comprise an outer surface i.e. a surface facing away from the outer surface of the outer anchor part. In other words, a radially outer or outermost surface. The outer surface of the second resilient portion e.g. the protruding portion, may comprise one or more ribs e.g. a rib. Here a rib means a ridge or protrusion in the second resilient portion which may be an elongate ridge or protrusion. In other words, the outer surface of the second resilient portion may be ribbed.

The one or more ribs may extend in a direction around the perimeter of the outer anchor part e.g. a circumferential direction. Alternatively, the one or more ribs may extend in a longitudinal direction. In some embodiments, the outer surface of the of the second resilient portion may comprise one or more ribs extending around the perimeter of the outer anchor part e.g. in a circumferential direction, and one or more ribs extending in a longitudinal direction. There may be 2 to 6 ribs, more preferably 3 to 5 ribs, for example four ribs. There may be more than 6 ribs.

The one or more ribs may have an angled profile. In some embodiments, the one or more ribs may have an angled profile in a cross-section substantially transverse e.g. perpendicular, to the circumferential direction. The angled profile may be angled towards the second end of the bush such that the one or more ribs are angled towards the second end of the bush.

By providing one or more ribs on an outer surface of the second resilient portion, particularly ribs angled towards the second end of the bush, installation of the bush in a housing may be improved. Such a bush provides easier insertion (i.e. lower insertion force) and more resistance to removal (i.e. motion opposite the insertion direction).

The outer anchor part may comprise an outer anchor material. The outer anchor material may be metal e.g. cast aluminium. The outer anchor material may comprise a plastic or a plastic composite material e.g. glass reinforced nylon 6-6. For example, the outer anchor material may be a nylon plastic with glass reinforcement between 0 and 50%

The outer anchor material may be harder than the first resilient material, the second resilient material and/or the third resilient material.

In a second aspect there is provided a bush for inserting into a housing, the bush comprising: an outer anchor part having a tubular sidewall defining a bore; an inner anchor part within the bore; a first resilient portion extending between the outer anchor part and the inner anchor part and operably engaged with the outer anchor part and the inner anchor part to isolate vibrations therebetween; a second resilient portion positioned on an outer surface of the sidewall and having a protruding portion which protrudes above the outer surface of the sidewall and configured in use to contact the housing, wherein the outer surface of the sidewall comprises a pushout surface adjacent the protruding portion, wherein, before the bush is inserted into the housing, the pushout surface is exposed, and wherein the second resilient portion is configured such that, when the bush is inserted into the housing, a part of the protruding portion moves onto the pushout surface such that a pushout force is exerted on the housing by the pushout surface via the part of the protruding portion.

In an embodiment, "the pushout surface is exposed" is taken to mean that the protruding portion (e.g., the second resilient body) does not contact the pushout surface. In another embodiment, "the pushout surface is exposed" is taken to mean that no resilient material or portion is in contact with the pushout surface, and hence the surface is exposed. In a further embodiment, "the pushout surface is exposed" is taken to mean that the material of the outer anchor is exposed, for example, no other feature (e.g. material) covers the material of the outer anchor in region of the pushout surface.

Accordingly, in an embodiment, the second resilient portion is configured such that, before the bush is inserted into the housing, the protruding portion (e.g., the second resilient portion) does not contact the pushout surface, such that the push out surface is exposed.

By providing such a bush, the pushout force exerted on the housing by the pushout surface of the outer anchor part via the part of the protruding portion which moves onto the pushout surface is surprisingly increased compared to a bush wherein no protruding portion and exposed pushout surface is provided. The increased pushout force improves the retention of the bush within the housing and reduces the likelihood of the bush disengaging with the housing when in use.

The bush of the second aspect may be a bush according to the first aspect. Accordingly, the features and advantages discussed above with respect to the first aspect apply equally to, and are hereby restated in respect of, the second aspect. For example, in an embodiment, the outer anchor part may comprise an aperture extending through the sidewall, and an intermediate resilient portion extending through the aperture. In some other embodiments, no such aperture may exist, and the first and second resilient portions may be entirely separated by the outer anchor. In some further embodiments, no such aperture may exist, and the first and second resilient portions may be joined by an intermediate resilient portion which does not extend through an aperture, for example, but which wraps around an end of the outer anchor.

The bush comprises a first end and a second end opposite the first end. A longitudinal axis may extend between the first end and the second end. A longitudinal direction may be defined along the longitudinal axis. A radial direction may be defined as a direction substantially perpendicular to the longitudinal axis. The first end may be configured to be inserted first into the housing. For example, the first end may comprise a chamfer e.g. the outer anchor part may comprise a chamfer at the first end.

The second resilient portion is positioned on an outer surface of the sidewall of the outer anchor part. In other words, the second resilient portion is positioned on a surface of the sidewall which faces away from the inner anchor part i.e. a radially outer surface.

The protruding portion protrudes above the outer surface of the sidewall e.g. in a radial direction. In other words, a radial height of the protruding portion is greater than a radial height of the outer surface of the sidewall e.g. a maximum radial height of the outer surface of the sidewall. The radial heights herein may be measured from the longitudinal axis.

The protruding portion may protrude above all or some of the outer surface of the sidewall. For example, the protruding portion may protrude above the pushout surface. In other words, the radial height of the protruding portion may be greater than a radial height e.g. a maximum radial height, of the pushout surface. In a preferred embodiment, the protruding portion protrudes above the entire outer surface of the sidewall before insertion into a housing and protrudes above some of the outer surface e.g. the pushout surface, after the bush is inserted into a housing.

The protruding portion may protrude above the outer surface of the sidewall e.g. the maximum radial extent of the outer surface of the sidewall, in the radial direction by between 0.3 mm and 1.5 mm e.g. between, 0.35 mm and 1.4 mm, e.g. between 0.4 mm and 1.3 mm, e.g. between 0.45 mm and 1.2 mm e.g. between 0.5 mm and 1.1 mm e.g. between 0.55 mm and 1 mm e.g. between 0.6 mm and 0.9 mm e.g. between 0.65 mm and 0.8 mm e.g. between 0.7 mm and 0.75 mm, preferably by about 0.75 mm.

The second resilient portion is configured such that, upon application of a force e.g. a shear force, a part of the protruding portion moves onto the pushout surface.

For example, the protruding portion is configured to contact the housing in use i.e. when the bush is (being) inserted into the housing, or after the bush is inserted into the housing. As a result, when an insertion force is applied to the bush in a longitudinal direction, the housing exerts an opposing shearing force on the protruding portion. Thus, as the bush is inserted into the housing, a part of the protruding portion is moved onto the pushout surface by the action of the opposing shearing force. For example, due to its resilient nature, the part of the protruding portion is moveable onto the pushout surface on application of the shearing force, for example, applied by the housing when the bush is inserted into the housing. The part of the protruding portion is then retained on the pushout surface by opposing radial forces, for example, as applied by the housing (e.g. a radially inward force) and the pushout surface (e.g. a radially outward force). These opposing radial forces act to resist the natural spring-back tendency of the resilient nature of the part of the protruding portion.

In other words, the bush is configured to change, on insertion of the bush into a housing, from a first configuration in which the pushout surface is exposed, to a second configuration in which a part of the protruding portion of the second resilient portion covers or contact at last a portion of the pushout surface.

After insertion of the bush into the housing, the part of the protruding portion which moves onto the pushout surface remains on the pushout surface, between the housing and the pushout surface. In use a radially outward force (the pushout force) is applied to the housing by the bush so that the bush is retained in the housing during use. In particular the outer surface of the outer anchor part applies the pushout force to the housing, and in the region of the pushout surface, this force is applied via the part of the protruding portion which is supported by (i.e. has moved onto) the pushout surface.

The pushout surface may also be defined as the region of the outer surface of the outer anchor part which, after the bush is inserted into the housing, supports the part of the protruding portion which moves onto the pushout surface. In other words, the pushout surface may be considered, and interchangeably referred to, as a support surface or support region or support platform of the outer surface of the sidewall of the outer anchor part.

The pushout surface is adjacent e.g. longitudinally adjacent, the protruding portion. In other words, the pushout surface may extend e.g. longitudinally extend, from the protruding portion such that the region of the outer surface of the sidewall having the second resilient portion thereon and the region of the outer surface of the sidewall which is the pushout surface are adjacent. For example, the pushout surface may longitudinally extend from the protruding portion towards the second end of the bush. The pushout surface may be between e.g. longitudinally between, the protruding portion and the second end of the bush.

The second resilient portion e.g. the protruding portion, may be spaced from the second end of the bush. In other words, the second resilient portion may be proximate the first end of the bush. In some embodiments, the second resilient portion e.g. the protruding portion, may be spaced from the first end of the bush. In other words, the second resilient portion may be proximate the second end of the bush. The second resilient portion may be a thin annulus e.g. an annulus having a length in the longitudinal direction which is less than about 50% the longitudinal length of the bush e.g. less than about 40% e.g. less than about 30% e.g. less than about 20% e.g. less than about 10% the longitudinal length of the bush.

By providing the second resilient portion which is spaced from second end of the bush and is a thin annulus, less resilient material is required to achieve retention of the bush in a housing. In other words, localised pushout force is provided by a localised area of rubber.

The protruding portion may extend around a perimeter of the outer anchor part. For example, the protruding portion may extend partially or fully around the perimeter of the outer anchor part. In embodiments wherein the outer anchor part is substantially cylindrical, the protruding portion may extend circumferentially around the outer anchor part e.g. fully or partially circumferentially around the outer anchor part.

Similarly, the pushout surface may extend around the perimeter of the outer anchor part e.g. to the extent that the protruding portion extends around the perimeter of the outer anchor part. In embodiments wherein the outer anchor part is substantially cylindrical, the pushout surface may extend circumferentially around the outer anchor part e.g. to the extent that the protruding portion extends circumferentially around the outer anchor part.

The pushout surface may comprise a recess e.g. a depression or pocket. The recess may be for partially receiving the part of the protruding portion which moves onto the pushout surface. In other words, the protruding portion may be configured such that, when the bush is inserted into the housing, the part of the protruding portion which moves onto the pushout surface is partially received in the recess.

The recess in the pushout surface may be spaced e.g. longitudinally spaced, from the protruding portion. In other words, a region of the pushout surface may separate the recess and the protruding portion. Alternatively, the recess in the pushout surface may be adjacent i.e. not spaced, from the protruding portion. In embodiments where the recess is spaced from the protruding portion, the region of the pushout surface between the recess and the protruding portion may be a radially extending wall e.g. radially extending from a bottom surface of the recess.

The recess in the pushout surface may be spaced from the protruding portion by between 1 mm and 8 mm e.g. between 1 mm and 6 mm e.g. between 1 mm and 4 mm e.g. between 2 mm and 3 mm, preferably by about 2 mm. The recess may have a radial depth of 0.2 mm or greater. For example the recess may have a radial depth of between 0.2 mm and 15 mm, e.g. between 1 mm and 14 mm e.g. between 2 mm and 13 mm e.g. between 3 mm and 12 mm, e.g. between 4 mm and 11 mm e.g. between 5 mm and 10 mm e.g. between 6 mm and 9 mm e.g. between 7 mm and 8 mm. For example, in some embodiments the recess has a radial depth of 0.2 mm, in other embodiment the recess has a radial depth or 11 mm. The recess may extend in the longitudinal direction by between 5 mm and 15 mm, e.g. between 7 mm and 13 mm e.g. between 9 mm and 11 mm e.g. between 10 mm and 11 m, preferably 11 mm.

The recess may extend to the second end of the bush e.g. the recess may extend to a radially extending end wall at the second end of the bush or, in some embodiments, no such end wall at the second end may be present.

The recess may be substantially rectangular. The recess may partially or fully extend around the perimeter of the outer anchor part e.g. circumferentially around the outer anchor part. The recess may comprise one or more dividing walls. The dividing walls may separate the recess into a plurality of pockets. The dividing walls may extend in a longitudinal direction and/or a perimetrical e.g. circumferential direction. The longitudinally extending dividing walls may be substantially evenly or uniformly spaced around the perimeter of the outer anchor part e.g. around the circumference. In other embodiment, the longitudinally extending dividing walls may be spaced around the perimeter with different spacing between them. The perimetrically extending dividing walls may be spaced e.g. evenly or uniformly spaced, in the longitudinal direction. The dividing walls may have a draft angle to facilitate manufacture by moulding. Some or all of the dividing walls may be spaced by between 10 mm and 30 mm e.g. between 12 mm and 28 mm e.g. between 14 mm and 26 mm e.g. between 16 mm and 24 mm e.g. between 18 mm and 22 mm, preferably by about 20 mm.

The recess in the pushout surface may be spaced e.g. longitudinally spaced, from the protruding portion by a first distance. The protruding portion may have a protruding portion length in the longitudinal direction. The protruding portion length may be greater than the first distance by which the recess is spaced from the protruding portion.

By providing a protruding portion length greater than the first distance by which the recess is spaced from the protruding portion, the part of the protruding portion which moves onto the pushout surface may be received more easily in the recess.

The protruding portion may comprise a protruding portion material. The protruding portion material may be the same material as the second resilient portion i.e. the protruding portion material may be the second resilient material. The protruding portion material may be rubber. The protruding portion material may have a Shore A hardness of between 40 and 58, e.g. between 42 and 56 e.g. between 44 and 54 e.g. between 44 and 52, e.g. between 44 and 50, e.g. between 44 and 48, preferably about 45.

Any of the features of the first aspect may be combined with the second aspect and any of the features of the second aspect may be combined with the first aspect.

For example, the bush of the first aspect may have a second resilient portion which comprises a protruding portion which protrudes above the outer surface of the sidewall and is configured in use to contact the housing, wherein the outer surface of the sidewall comprises a pushout surface adjacent the protruding portion, wherein, before the bush is inserted into the housing, the pushout surface is exposed, and wherein the protruding portion is configured such that, when the bush is inserted into the housing, a part of the protruding portion moves onto the pushout surface such that a pushout force is exerted on the housing by the pushout surface via the part of the protruding portion.

The bush of the first aspect may have a first end which is configured to be inserted into the housing, wherein the pushout surface is between the protruding portion and the second end of the bush.

The bush of the first aspect may have a pushout surface which comprises a recess for partially receiving the part of the protruding portion which moves onto the pushout surface.

The bush of the first aspect may have a recess which is spaced from the protruding portion.

The bush of the first aspect may have a recess which is longitudinally spaced from the protruding portion by a first distance, wherein a protruding portion length in the longitudinal direction is greater than the first distance.

The bush of the first aspect may have a protruding portion formed from material which has a Shore A hardness of between 40 and 58, e.g. between 42 and 56 e.g. between 44 and 54 e.g. between 44 and 52, e.g. between 44 and 50, e.g. between 44 and 48, preferably about 45.

In a third aspect, there is provided a method of manufacturing a bush for inserting into a housing. The method comprises the following steps: providing an outer anchor part having a tubular sidewall defining a bore and comprising an aperture extending through the sidewall; providing an inner anchor part within the bore; providing one or more resilient materials to form: a first resilient portion extending between the outer anchor part and the inner anchor part and operably engaged with the outer anchor part and the inner anchor part to isolate vibrations therebetween; a second resilient portion positioned on an outer surface of the sidewall and configured in use to contact the housing; an intermediate resilient portion interposed between the first and second resilient portions an extending through the aperture.

In an embodiment, "in use" means when the bush is (being) inserted into the housing, and/or after the bush is inserted into the housing.

By providing a method according to the third aspect, the second resilient portion on the outer surface of the sidewall may be manufactured by passing a resilient material between the inner and outer anchor parts and through the aperture in the outer surface of the outer anchor. This may improve the manufacturability of the bush and in particular the formation of the second resilient material on the outer surface of the bush i.e. outer anchor part, may be improved compared to moulding the second resilient material directly onto the outer surface. For instance, this structure facilitates formation of integrally formed first, second and intermediate resilient portions. Further, advantages of this structure are not limited to integral formation of the first, second and intermediate resilient portions. For example, the formation of the second resilient portion alone may be improved since the resilient material may flow into position via the aperture, i.e., from inside the outer anchor (e.g. from behind). In this way, it may be easier to avoid rubber flashing as it is possible to provide a more reliable stop on the outer surface of the outer anchor part.

The step of providing one or more resilient materials may comprise: inserting the one or more resilient materials between the inner anchor part and the outer anchor part such that the one or more resilient materials flow between the inner anchor part and the outer anchor part and through the aperture in the sidewall to form the first resilient portion, the intermediate resilient portion and the second resilient portion.

For example, the step of providing one or more resilient materials may comprise: inserting a resilient material between the inner anchor part and the outer anchor part such that the resilient material flows between the inner anchor part and the outer anchor part and through the aperture in the sidewall to integrally form the first resilient portion, the intermediate resilient portion and the second resilient portion.

By providing a bush wherein the first resilient portion, the second resilient portion and the intermediate resilient portion are integrally formed, the first resilient portion, the second resilient portion and the intermediate resilient portion may be manufactured in a single step. Accordingly, the manufacturability of the bush may be improved and simplified resulting in a reduction of cost and time.

The method of the third aspect may be used to manufacture a bush according to the first aspect or the second aspect.

The bush according to the first and second aspects and the bush manufactured according to the third aspect may comprise additional components. For example, the first resilient portion may comprise an additional element such as a tuning element. The tuning element may be integrally formed with the first resilient portion and configured to reduce dynamic stiffness increases associated with eigenmodes of the first resilient portion within a predetermined operational vibration frequency range. The tuning element may resemble an upstanding wall or wing on an external surface of the first resilient portion e.g. a longitudinally facing or radially facing external surface. For example, the tuning element may be as described in PCT patent application no. PCT/EP2019/076458 having publication number WO2020/070069A.

In another example, the first resilient portion may comprise an inertial mass to provide a flat dynamic stiffness profile within a predetermined operation vibration frequency range. In this example, additional resilient portions may be provided between the outer anchor part and the inner anchor part. For example, this configuration may be as described in PCT patent application no. PCT/EP2019/058691 having publication number WO2019197294A.

The first resilient portion may comprise one or more longitudinally extending apertures which extend from the first end of the bush to the second end. For example, the first resilient portion may comprise 4 longitudinally extending apertures. In some embodiments, the longitudinally apertures form a plurality of radially extending spokes in the first resilient portion to interposed between the inner anchor part and the outer anchor part.

The invention includes the combination of the aspects and preferred features described except where such a combination is clearly impermissible or expressly avoided.

SUMMARY OF THE FIGURES

Embodiments and experiments illustrating the principles of the invention will now be discussed with reference to the accompanying figures in which.

DETAILED DESCRIPTION

Aspects and embodiments of the present invention will now be discussed with reference to the accompanying figures. Further aspects and embodiments will be apparent to those skilled in the art. All documents mentioned in this text are incorporated herein by reference.

Figure 1:
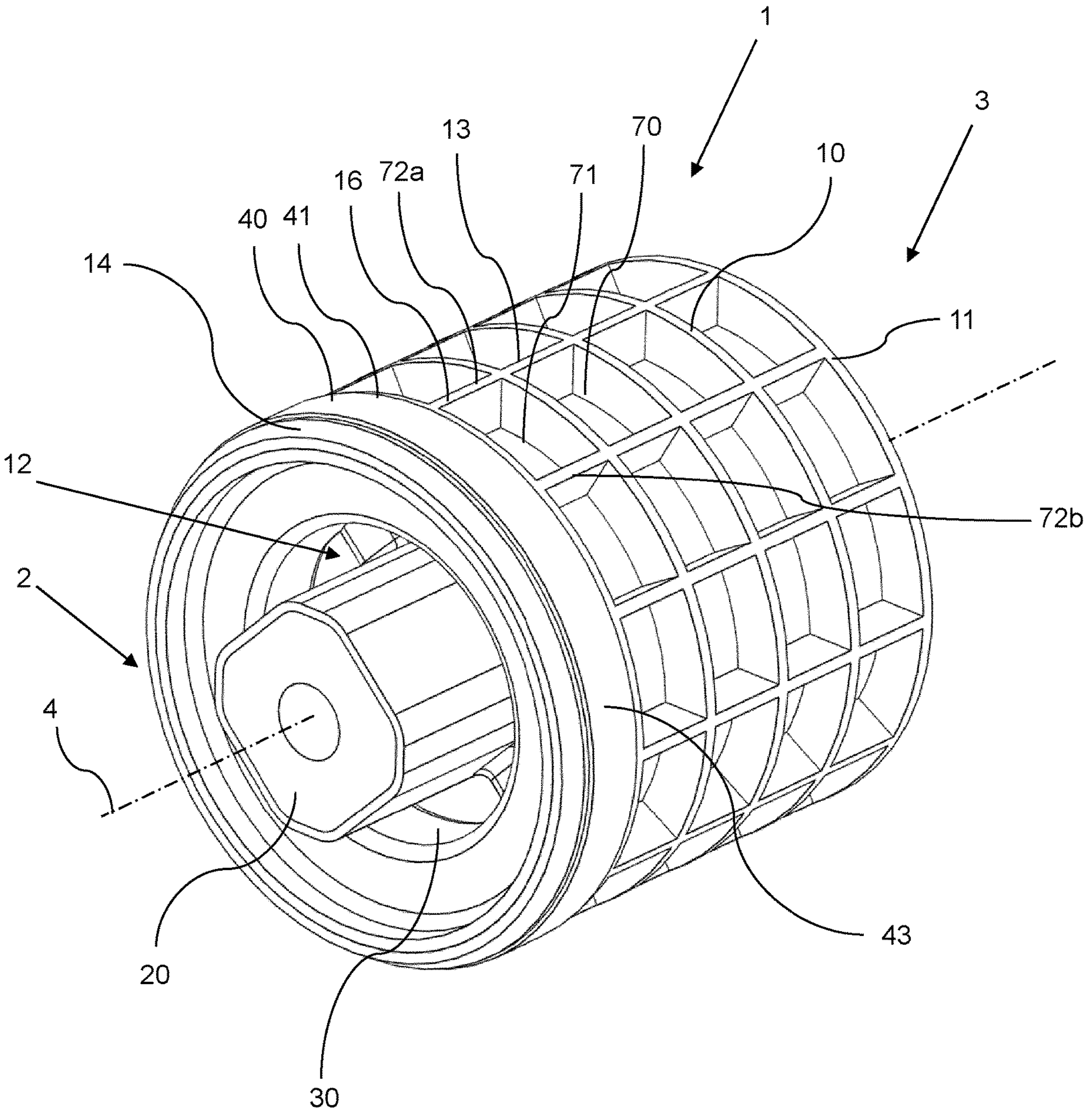
FIG. 1 shows a perspective view of a bush according to an embodiment of the present disclosure.

FIG. 1 shows a bush 1 according to an embodiment of the present disclosure. The bush 1 is for inserting into a housing (not shown). The bush 1 comprises an outer anchor part 10 having a tubular sidewall 11 defining a bore 12; an inner anchor part 20 within the bore 12; a first resilient portion 30 extends between the outer anchor part 10 and the inner anchor part 20 and is operably engaged with the outer anchor part 10 and the inner anchor part 20 to isolate vibrations therebetween. A second resilient portion 40 is positioned on an outer surface 13 of the sidewall 11 and is configured in use to contact the housing.

In use the housing is part of a component of vibrating machinery. In use, the outer anchor part 10 is attached to the housing and another component of vibrating machinery is attached to the inner anchor part 20.

The bush 1 comprises a first end 2 and a second end 3 opposite the first end 2. A longitudinal axis 4 extends between the first end 2 and the second end 3. A longitudinal direction is defined along the longitudinal axis 4. A radial direction is defined in a direction substantially perpendicular to the longitudinal axis 4. Accordingly, the outer surface 13 is a radially outer surface.

The first end 2 is configured to be inserted first into a housing. The outer anchor part 10 at the first end 2 comprises a chamfer 14 which extends around the entire circumference of the first end 2. In other embodiments, the chamfer 14 may only partially extend around the perimeter e.g. circumference, of the first end 2. The chamfer 14 assists with insertion of the bush 1 into a housing.

Figure 2:
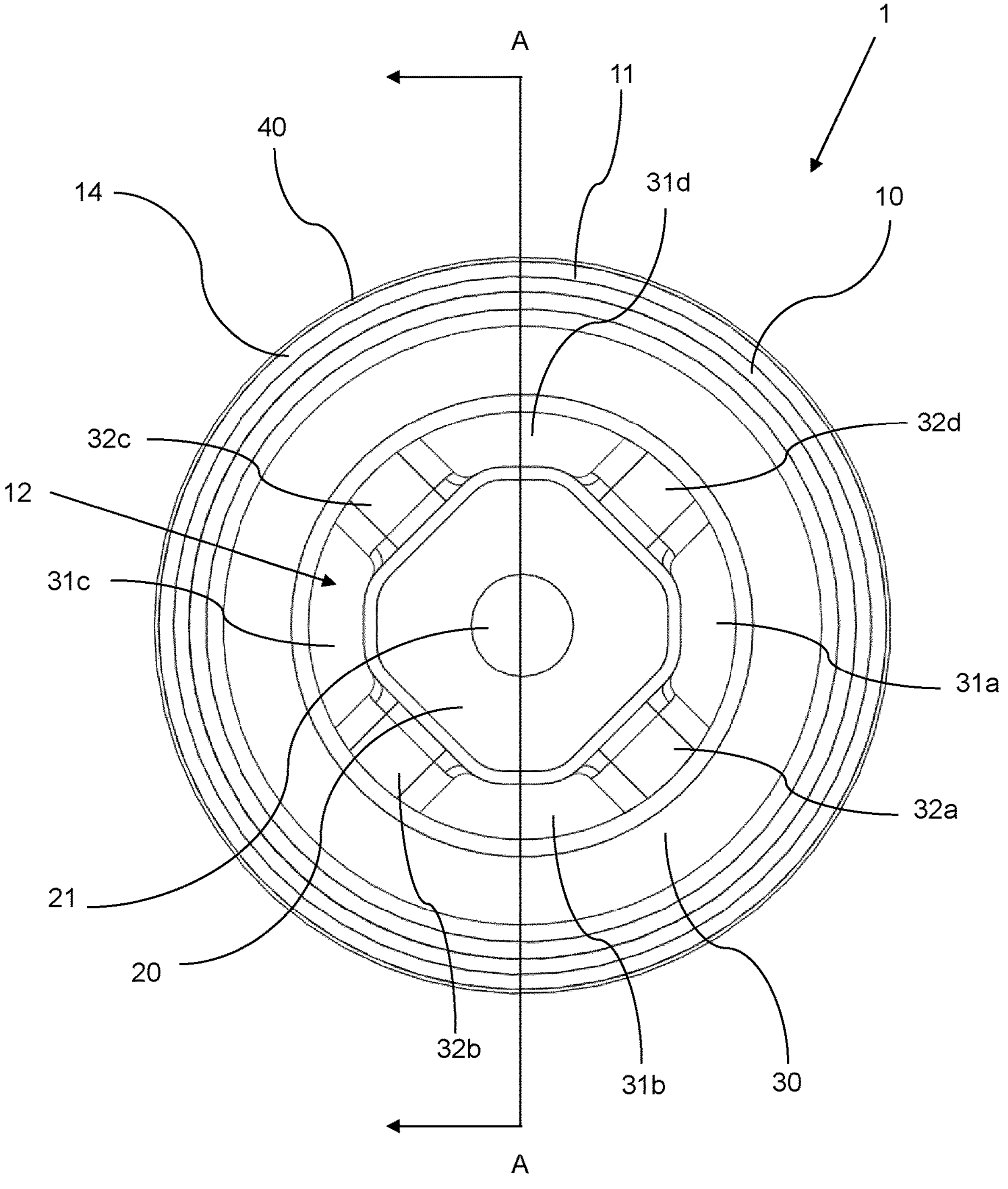
FIG. 2 shows a front view of the bush of FIG. 1.

FIG. 2 shows a view of the bush 1 in FIG. 1 from the first end 2. The same reference numerals are used in FIG. 2 in relation to the features shown in FIG. 1. As can be see, the inner anchor part 20 has a central bore 21 extending in the longitudinal direction i.e. out of the page in FIG. 2.

The first resilient portion 30 comprises four longitudinally extending apertures 31*a*, 31*b*, 31*c*, 31*d* which extend through the first resilient portion 30 in the longitudinal direction. These longitudinally extending apertures form a plurality of radially extending spokes 32*a*, 32*b*, 32*c*, 32*d* in the first resilient portion 30 interposed between the inner anchor part 20 and the outer anchor part 10. In other embodiments, the first resilient portion 30 may have a different form. For example, in some other embodiments, a different number of spokes and/or longitudinally extending apertures are provided. In some further embodiments, the first resilient portion 30 may not have spokes or longitudinally extending apertures so as to form a substantially solid resilient structure between the first and second anchor parts.

The outer anchor part 10 is a hollow sleeve. The inner anchor part 20 is a tube extending approximately centrally and coaxially of the outer anchor part 10. The first resilient portion is disposed within a volume between the sleeve and tube. Both the outer anchor part 10 and inner anchor part 20 are generally circular in cross-section.

As seen in FIG. 2, the tubular sidewall 11 of the outer anchor part 10 has an annular cross-section transverse to the longitudinal axis 4. The bore 12 defined by the tubular sidewall 11 extends the entire length of the outer anchor part 10 in the longitudinal direction. The bore 12 has a bore diameter of 60 mm and which is substantially uniform along the length of the outer anchor part (see FIG. 3). 10. The exterior diameter of the tubular sidewall 11 is 100 mm. The outer anchor part 10 has a length in the longitudinal direction 80 mm. The bush shown in the Figures is suitable for use in an electric vehicle (EV).

As is clear from FIGS. 1 and 2, the outer anchor part 10 is substantially cylindrical i.e. the tubular sidewall 11 is substantially cylindrical and the bore 12 of the outer anchor part 10 is substantially cylindrical. The second resilient portion 40 extends fully around the circumference of the outer anchor part 10 (see FIG. 2).

Figure 3:
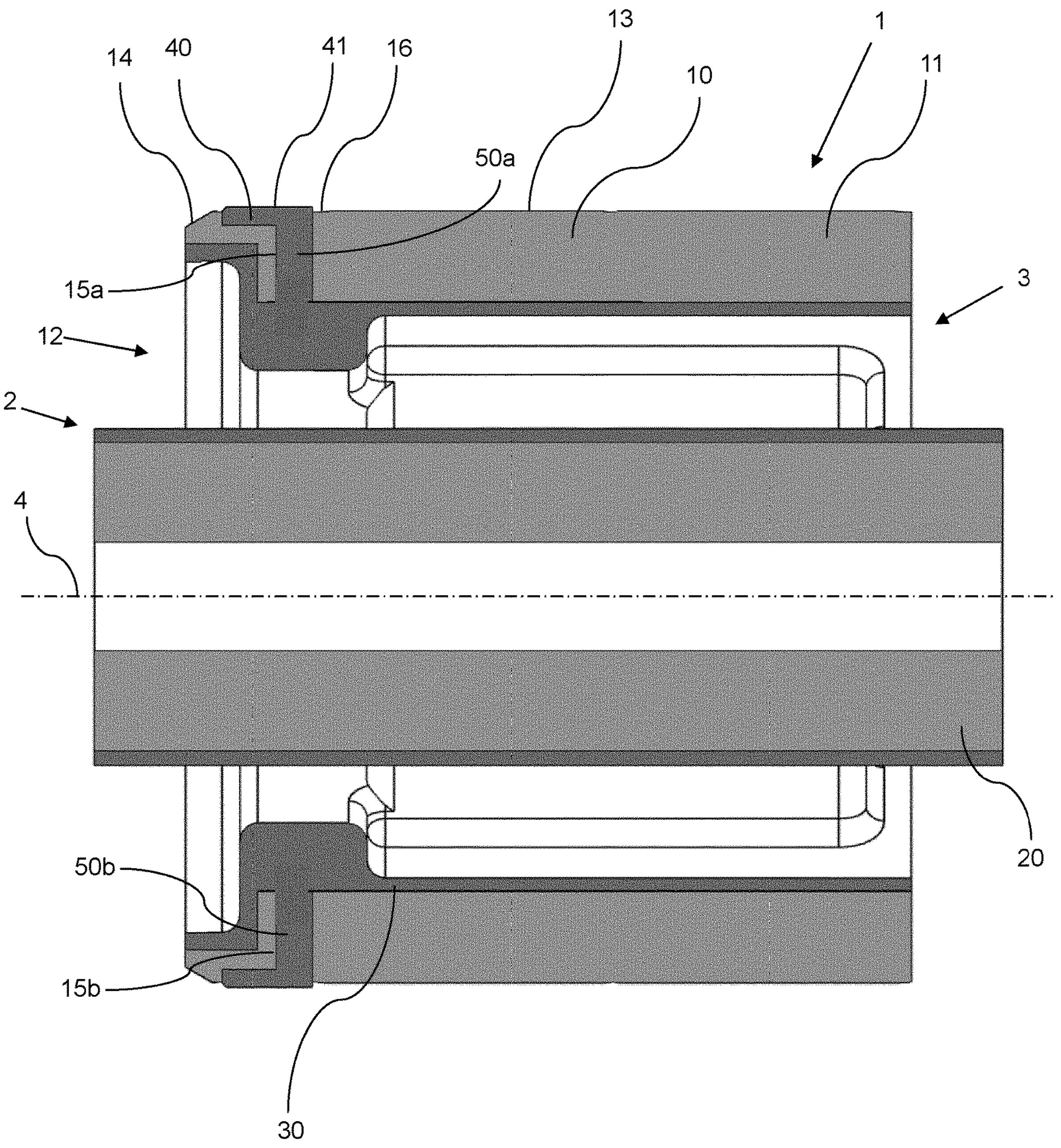
FIG. 3 shows a cross-sectional view of the bush of FIG. 1 along the line A-A in FIG. 2.

FIG. 3 shows a cross-section view of the bush 1 taken along the line A-A shown in FIG. 2. FIGS. 1 to 3 show the bush 1 before insertion into a housing. The same reference numerals are used in FIG. 3 in relation to the features shown in FIG. 1 and FIG. 2. As the bush 1 is substantially cylindrical, the components shown in FIG. 3 rotationally extend around the longitudinal axis 4 such that the components visible above the longitudinal axis 4 are, unless indicated, the same as those shown below the longitudinal axis 4 (i.e. in mirror image).

As seen in FIG. 3, a plurality of intermediate resilient portions 50*a*, 50*b* are interposed between the first resilient portion 30 and the second resilient portion 40. The outer anchor part 10 comprises a plurality of apertures 15*a*, 15*b* through which extend radially through the sidewall 11. Each of the plurality of intermediate resilient portions 50*a*, 50*b* extend through a corresponding one of the plurality of apertures 15*a*, 15*b*. Each of the plurality of apertures 15*a*, 15*b* extends in a radial direction from the outer surface 13 of the sidewall 11 to an inner surface. Each of the plurality of apertures 15*a*, 15*b* are through holes in the sidewall 11. Each of the plurality of apertures 15*a*, 15*b* are in fluid communication with the bore 12 and are each substantially perpendicular to the bore 12. Each of the plurality of apertures 15*a*, 15*b* is a circular hole with a diameter of about 6 mm.

Although not visible in the Figures, there are 4 apertures in this embodiment, with only two of the plurality of apertures (15*a*, 15*b*) shown. There are also 4 corresponding intermediate resilient portions, although only two of the plurality of intermediate resilient portions (50*a*, 50*b*) are shown. The plurality of apertures is substantially evenly spaced around the circumference of the outer anchor part 10. The corresponding plurality of intermediate resilient portions is substantially evenly spaced around the circumference of the outer anchor part 10. In this embodiment, each of the four apertures (e.g. 15*a*, 15*b*) are circumferentially spaced by about 90 degrees about the longitudinal axis 4 when viewed from e.g. the first end 2. In the same way, the corresponding intermediate resilient portions are spaced circumferentially by about 90 degrees.

Each of the plurality of intermediate resilient portions e.g. 50*a*, 50*b*, are directly connected to the first resilient portion 30 and the second resilient portion 40. The first resilient portion 30, the plurality of intermediate resilient portions (e.g. 50*a*, 50*b*) and the second resilient portion 40 are integrally formed i.e. are a single piece e.g. a continuous or unitary piece, of resilient material, for example, via a moulding or injection moulding process.

When the bush 1 shown in the Figures is manufactured, the first resilient portion 30, the plurality of intermediate resilient portions (e.g. 50*a*, 50*b*) and the second resilient portion 40 are manufactured in a single step. A resilient material is injected into the bush 1 between the outer anchor part 10 and the inner anchor part 20 to form the first resilient portion 30. The resilient material flows through the plurality of apertures (e.g. 15*a*, 15*b*) and onto the outer surface 13 of the sidewall 11. Here the second resilient portion 40 is formed and the plurality of intermediate portions e.g. (50*a*, 50*b*) are formed to connect the first resilient portion 30 and the second resilient portion 40 as a consequence of this manufacturing process.

Figure 4:
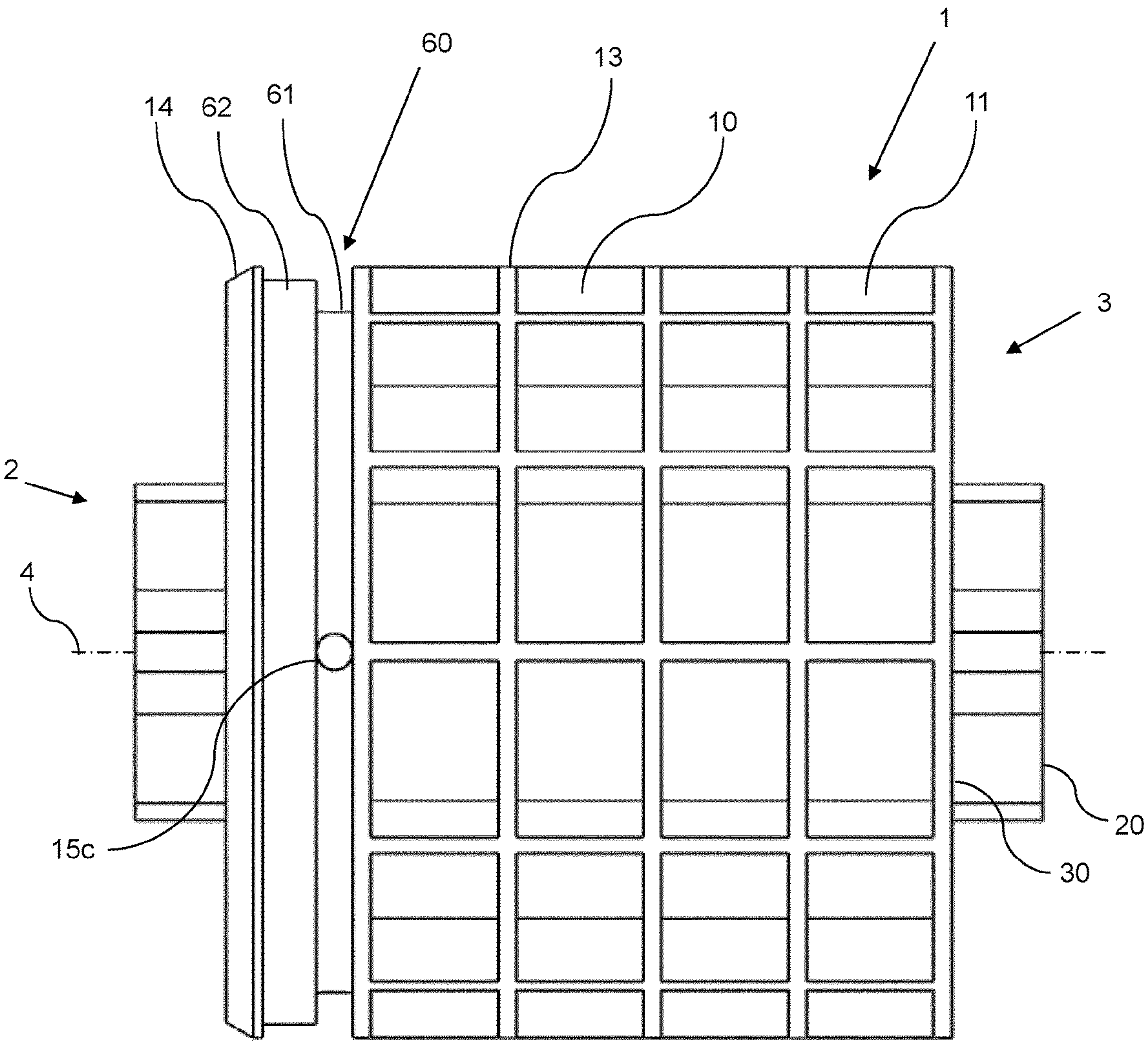
FIG. 4 shows a side view of the bush 1 in FIG. 1.

FIG. 4 shows a side view of the bush 1 in FIG. 1. The same reference numerals are used in FIG. 4 in relation to the features shown in FIGS. 1 to 3. FIG. 4 shows a different one 15*c* of the plurality of apertures in the outer anchor part 10. In FIG. 4, the second resilient portion 40 and the plurality of intermediate resilient portions (e.g. 50*a*, 50*b*) are removed for clarity.

Where the second resilient portion 40 would be, FIG. 4 shows that the outer surface 13 of the sidewall 11 comprises a circumferential groove 60 which extends around the entire outer anchor part 10. The circumferential groove 60 comprises the plurality of apertures (e.g. 15*a*, 15*b*, 15*c*). In other words, the plurality of apertures (e.g. 15*a*, 15*b*, 15*c*) are within the circumferential groove 60. During moulding, the resilient material flows out of the plurality of apertures (e.g. 15*a*, 15*b*, 15*c*) and around the circumferential groove 60, which helps to form the second resilient portion 40 (not shown). The circumferential groove 60 comprises a step, such that there is a first portion 61 of the circumferential groove 60 which is recessed from the outer surface 13 of the sidewall 11 by a first radial depth and a second portion 62 of the circumferential groove 60 which is recessed from the outer surface 13 of the sidewall 11 by a second radial depth. The first radial depth is 6 mm and the second radial depth is 3 mm. The first portion 61 of the circumferential groove 60 is towards the second end 3 of the bush 1 and the second portion 62 of the circumferential groove 60 is towards the first end 2 of the bush 1. The circumferential groove has a length in the longitudinal direction of 10 mm the first portion 61 has a length in the longitudinal direction of 6 mm the second portion has a length in the longitudinal direction of 4 mm.

Each of the plurality of apertures 15*a*, 15*b* are formed in the first portion 61 of the circumferential groove 60 i.e. the radially innermost portion. Each of the plurality of apertures 15*a*, 15*b* extend between an inner surface of the sidewall 11 to an outer surface of the first portion 61 of the circumferential groove 60 such that the plurality of apertures 15*a*, 15*b* are in fluid communication with the circumferential groove 60.

Returning to FIG. 3, the second resilient portion 40 protrudes above the outer surface 13 of the tubular sidewall 11. The second resilient portion 40 has a first radial height which is greater than the maximum radial height of the outer surface 13. The portion of the second resilient portion 40 which protrudes radially above the outer surface 13 of the sidewall 11 can be referred to as the protruding portion 41. In other words, the protruding portion 41 has a radial height which is greater than the maximum radial height of the outer surface 13. The second resilient portion 40, i.e. the protruding portion 41, protrudes above the maximum radial extent of the outer surface 13 by about 0.75 mm. The second resilient portion 40, more specifically the protruding portion 41, is configured in use to contact the housing into which the bush 1 is inserted.

As with the second resilient portion 40, the protruding portion 41 extends around the entire circumference of the outer anchor part 10.

The outer surface 13 of the sidewall 11 comprises a pushout surface 16 longitudinally adjacent the protruding portion 41 of the second resilient portion 40 such that the pushout surface 16 extends longitudinally from the protruding portion towards the second end 3 of the bush 1. The pushout surface 16 is between the protruding portion 41 and the second end 3 of the bush 1. The pushout surface 16 extends around the entire circumference of the outer anchor part 10.

The protruding portion 41 protrudes above the pushout surface 16 (as it is part of the outer surface 13). The radial height of the protruding portion 41 is greater than the maximum radial height of the pushout surface 16.

Before the bush 1 is inserted into a housing, the pushout surface 16 is exposed (as shown in FIGS. 1 and 3). The second resilient portion 40 is configured such that an application of a shear force causes a part of the protruding portion 42 to move. A shear force is applied to the second resilient portion 40, more specifically the protruding portion 41 when the bush 1 is inserted into a housing. This is because in use, the second resilient portion 40, more specifically the protruding portion 41, contacts the housing (when the bush 1 is being inserted into the housing) and an insertion force applied in a longitudinal direction necessarily results in an opposing shear force applied by the housing on the second resilient portion 40, more specifically the protruding portion 41.

Thus, when the bush 1 is inserted into the housing, a part of the protruding portion 42 moves onto the pushout surface 16 such that a pushout force (i.e. radial force) is exerted on the housing by the pushout surface 16 via the part of the protruding portion 42 which moves onto the pushout surface 16. Accordingly, the pushout surface 16 may also be defined as a support surface or support region of the outer surface 13 of the sidewall 11. This is because it supports the part of the protruding portion 42 which moves.

Figure 5:
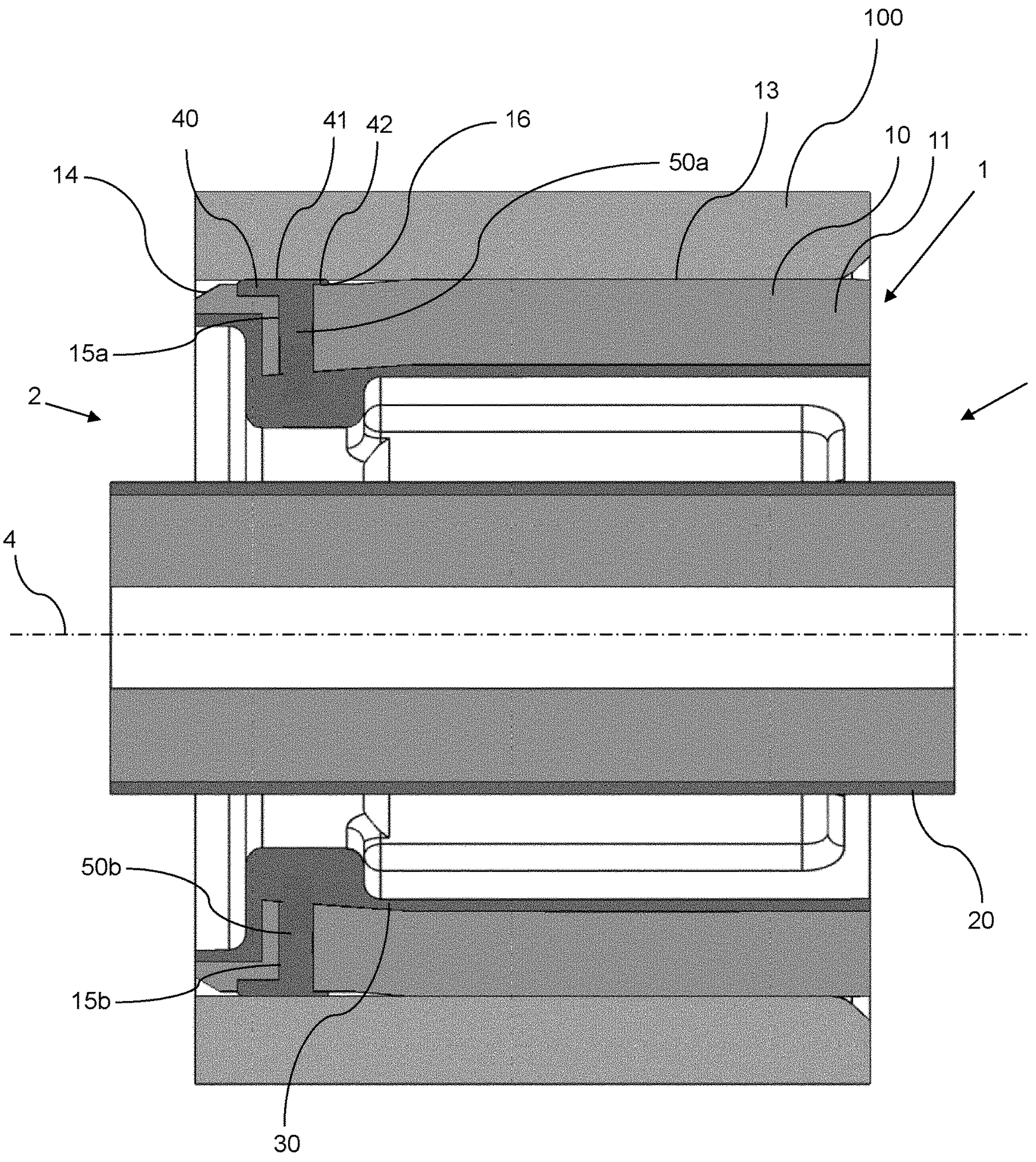
FIG. 5 shows the cross-sectional view of the bush in FIG. 3 after the bush is inserted in a housing.

FIG. 5 shows the bush 1 of FIG. 1 after it is inserted into a housing 100. The same reference numerals are used in FIG. 5 in relation to the features shown in FIGS. 1 to 4. As shown in FIG. 5, a part of the protruding portion 42 is on the pushout surface 16 such that a pushout force is applied to the housing 100 by the pushout surface 16 via the part of the protruding portion 42. The pushout surface 16 is no longer exposed in FIG. 5.

After the bush 1 is inserted into the housing 100, and as shown in FIG. 5. The protruding portion 41 (including the part of the protruding portion 42 which moves) protrudes above the pushout surface but does not necessarily protrude above the entire outer surface 13 of the sidewall 11.

In FIG. 5, the bush 1 is configured to provide a radially outward force (pushout force) on the housing as a result of an interference fit. Specifically, the outer surface 13 applies the pushout force and in the region of the pushout surface 16, the pushout force is applied via the part of the protruding portion 42 which is supported by (i.e. has moved onto) the pushout surface 16.

As seen in FIG. 1, the outer surface 13 of the sidewall 11 comprises a plurality of recesses e.g. 70. In particular, the pushout surface 16 comprises a recess 71. The recess is longitudinally spaced from the protruding portion 41 by about 2 mm such that a region of the pushout surface 16*a* separates the recess 71 from the protruding portion 41. The longitudinal length of the protruding portion 41 is 10 mm such that it is longer than the spacing between the protruding portion 41 and the recess 71. The recess 71 is substantially rectangular. The recess 71 has a depth of about 20 mm and extends in the longitudinal direction by about 11 mm.

The recess 71 extends around the entire circumference of the outer anchor part 10 and comprises a plurality of longitudinally extending dividing walls e.g. 72*a*, 72*b* which are substantially evenly spaced around the circumference of the outer anchor part 10. The dividing walls e.g. 72*a*, 72*b* divide the recess 71 into a plurality of pockets. The dividing walls have a draft angle of between 0.5 degrees and 5 degrees e.g. between 1 degree and 4 degrees e.g. between 1.5 degrees and 3 degrees, for example 2 degrees.

Figure 6:
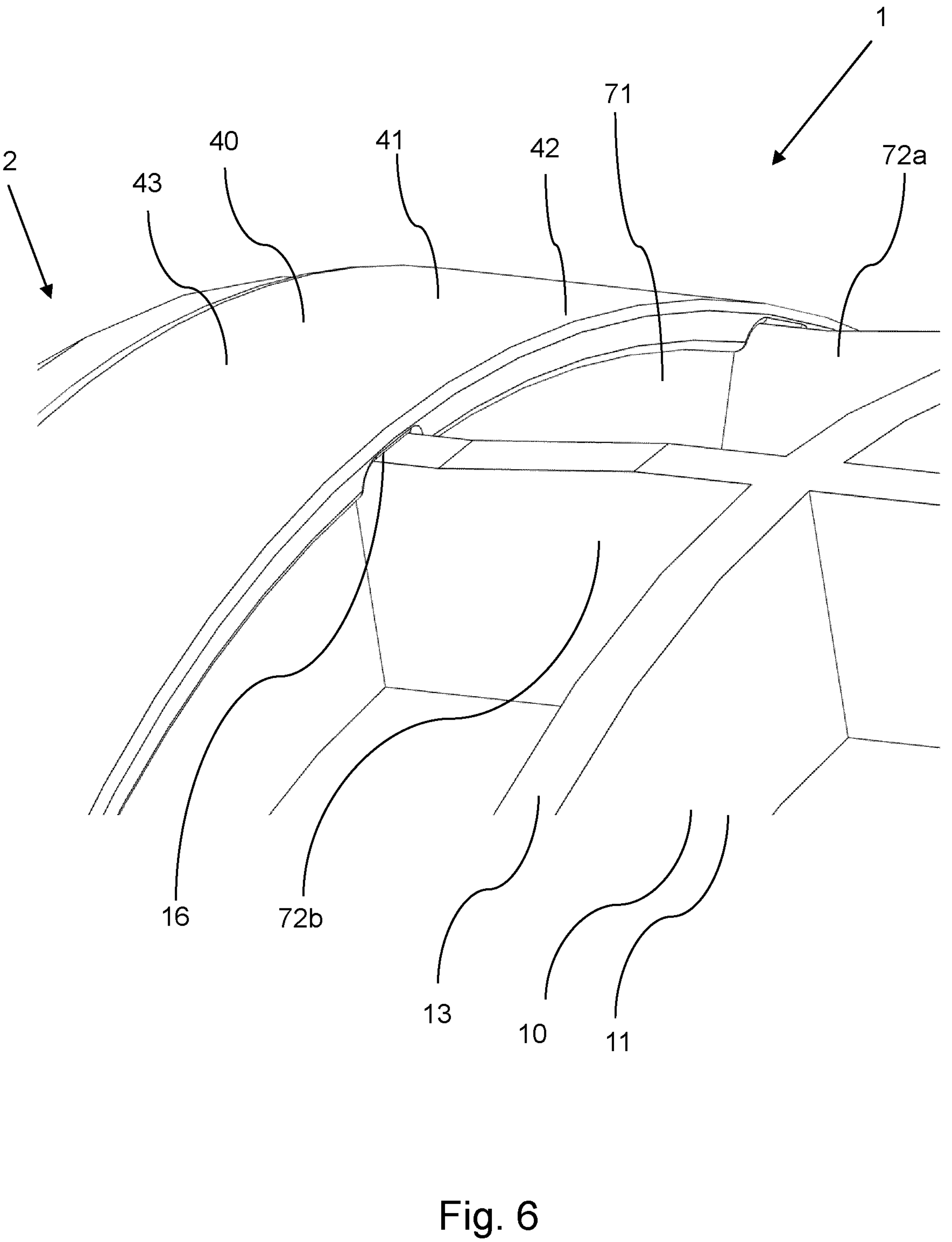
FIG. 6 shows a perspective view of the outer surface of the bush of FIG. 1 after the bush is inserted in a housing. The housing is removed to show features discussed herein.

FIG. 6 shows a perspective detail view of the bush 1 of FIG. 1 when in use. The housing 100 is removed for clarity. The same reference numerals are used in FIG. 6 in relation to the features shown in FIGS. 1 to 5. FIG. 6 shows the second resilient portion 40, the protruding portion 41 and the part of the protruding portion 42 which has moved onto the pushout surface 16. FIG. 6 also shows a detail view of the recess 71 and the dividing walls 72*a* and 72*b*. As shown in FIG. 6, the recess partially receives the part of the protruding portion 42 which moves onto the pushout surface 16 when the bush 1 is inserted into the housing.

In the embodiment shown in FIGS. 1 to 6, the first resilient portion 30, the plurality of intermediate portions e.g. 50*a*, 50*b* and the second resilient portion 40 (including the protruding portion 41) are injection moulded onto the bush 1 and are integrally formed of rubber with a Shore A hardness of 45.

Figure 7:
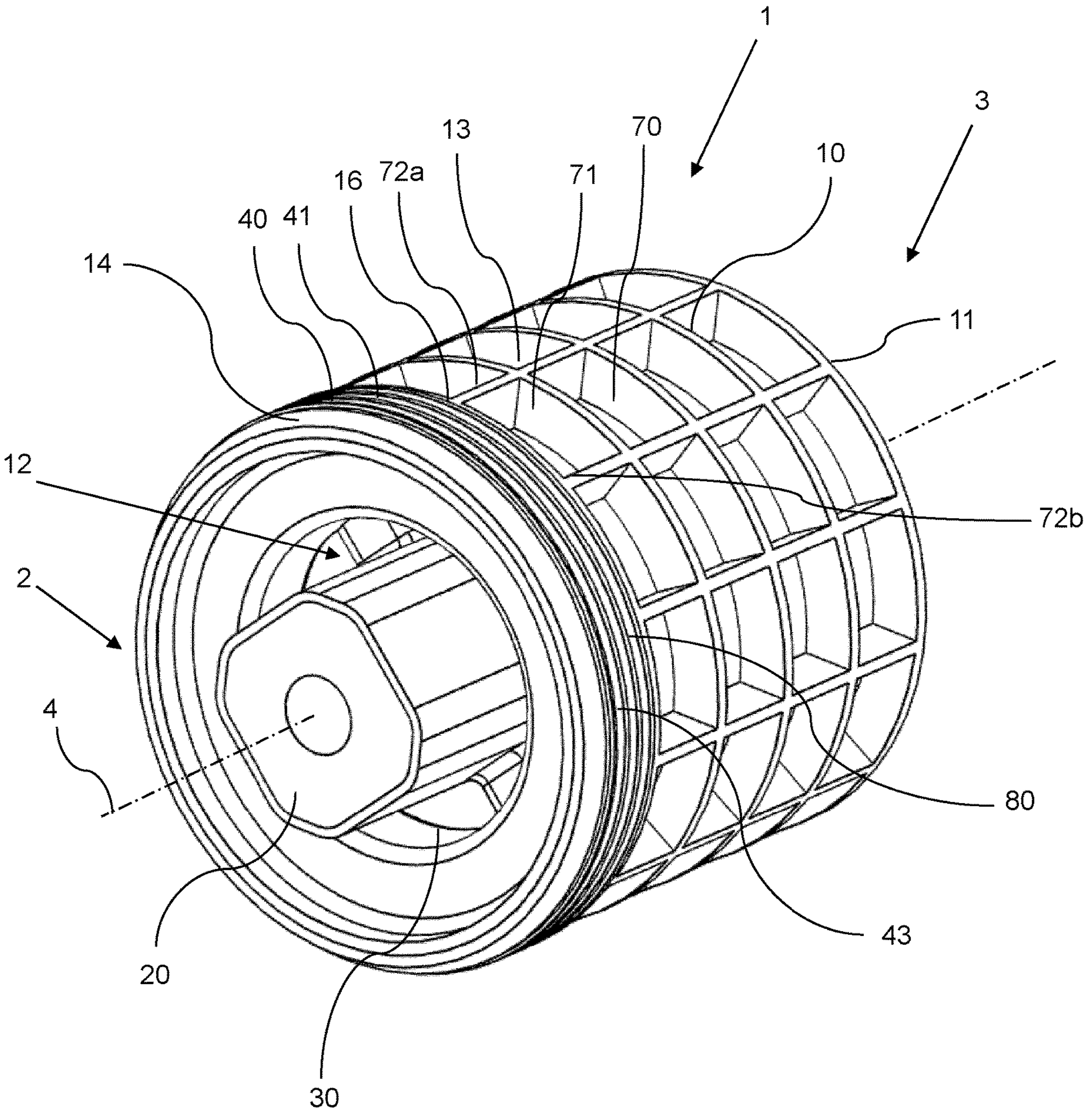
FIG. 7 shows an embodiment of a bush according to the present disclosure which is substantially the same as the embodiment shown in FIGS. 1 to 6 but the radially outer surface of the protruding portion is ribbed

In the embodiment shown in FIGS. 1 to 6, a radially outer surface 43 (see e.g. FIG. 1) of the second resilient portion 40 is featureless. FIG. 7 shows an embodiment of the bush 1 which is substantially the same as the embodiment shown in FIGS. 1 to 6 but the radially outer surface 43 is ribbed. The same reference numerals are used in FIG. 7 in relation to the features shown in FIGS. 1 to 6. The ribs e.g. 80 on the outer surface 43 of the second resilient portion 40 extend circumferentially around the entire circumference of the outer anchor part 10. In FIG. 7, the ribbed outer surface 43 has 4 ribs. The ribs e.g. 80 have an angled profile when viewed in a cross-section perpendicular to the circumferential direction and are angled towards the second end 3 of the bush 1. In this way, the angled ribs 80 act in an analogous manner to the chamfer 14 to facilitate easier entry of the bush into the housing. Additionally, the angled ribs 80 act to resist movement of the bush back out of the housing (in an opposite direction to the insertion direction).

In the embodiments shown in FIGS. 1 to 7, the outer anchor part 10 is formed of glass reinforce nylon 6-6 and is harder than the first resilient portion 30, the plurality of intermediate resilient portions e.g. 50*a*, 50*b* and the second resilient portion 40.

The features disclosed in the foregoing description, or in the following claims, or in the accompanying drawings, expressed in their specific forms or in terms of a means for performing the disclosed function, or a method or process for obtaining the disclosed results, as appropriate, may, separately, or in any combination of such features, be utilised for realising the invention in diverse forms thereof.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

For the avoidance of any doubt, any theoretical explanations provided herein are provided for the purposes of improving the understanding of a reader. The inventors do not wish to be bound by any of these theoretical explanations.

Any section headings used herein are for organizational purposes only and are not to be construed as limiting the subject matter described.

Throughout this specification, including the claims which follow, unless the context requires otherwise, the word “comprise” and “include”, and variations such as “comprises”, “comprising”, and “including” will be understood to imply the inclusion of a stated integer or step or group of integers or steps but not the exclusion of any other integer or step or group of integers or steps.

It must be noted that, as used in the specification and the appended claims, the singular forms “a,” “an,” and “the” include plural referents unless the context clearly dictates otherwise. Ranges may be expressed herein as from “about” one particular value, and/or to “about” another particular value. When such a range is expressed, another embodiment includes from the one particular value and/or to the other particular value. Similarly, when values are expressed as approximations, by the use of the antecedent “about,” it will be understood that the particular value forms another embodiment. The term “about” in relation to a numerical value is optional and means for example +/−10%.

The invention claimed is:

1. A bush for inserting into a housing, the bush comprising:

an outer anchor part having a tubular sidewall defining a bore;

an inner anchor part within the bore;

a first resilient portion extending between the outer anchor part and the inner anchor part and operably engaged with the outer anchor part and the inner anchor part to isolate vibrations therebetween;

a second resilient portion positioned along an outer surface of the sidewall before and after the bush is inserted into the housing and configured in use to contact the housing;

wherein the second resilient portion comprises a protruding portion which protrudes above the outer surface of the sidewall and is configured in use to contact the housing, wherein the outer surface of the sidewall comprises a pushout surface adjacent the protruding portion, wherein, before the bush is inserted into the housing, the pushout surface is exposed, wherein the second resilient portion is configured such that, when the bush is inserted into the housing, a part of the protruding portion moves onto the pushout surface such that a pushout force is exerted on the housing by the pushout surface via the part of the protruding portion, wherein the outer surface of the sidewall comprises a circumferential groove extending in a circumferential direction substantially perpendicular to a longitudinal direction around a circumference of the outer anchor part and wherein the second resilient portion is disposed in the circumferential groove, wherein the circumferential groove is recessed from the outer surface by a constant radial depth along a length of the circumferential groove in the circumferential direction, and wherein the sidewall comprises a first groove wall and a second groove wall that partially define the circumferential groove, the first groove wall and the second groove wall perpendicular to the longitudinal direction.

2. The bush according to claim 1, comprising an intermediate resilient portion interposed between the first and second resilient portions, wherein the outer anchor part comprises an aperture extending through the sidewall, and the intermediate resilient portion extends through the aperture, and wherein the circumferential groove comprises the aperture.

3. The bush according to claim 2, wherein the intermediate resilient portion is directly connected to the first resilient portion and/or the second resilient portion.

4. The bush according to claim 2, wherein the first resilient portion, the second resilient portion and the intermediate resilient portion are integrally formed.

5. The bush according to claim 2 wherein the second resilient portion extends around the circumference of the outer anchor part.

6. The bush according to claim 2 comprising a plurality of intermediate resilient portions, including the intermediate resilient portion, interposed between the first resilient portion and the second resilient portion, wherein the outer anchor part comprises a plurality of apertures, including the aperture, extending through the sidewall, and wherein each of the plurality of intermediate resilient portions extends through a corresponding one of the plurality of apertures.

7. The bush according to claim 1 wherein an outer surface of the second resilient portion comprises a rib.

8. The bush according to claim 1 wherein the first resilient portion and the second resilient portion are longitudinally offset from each other.

9. The bush according to claim 1 wherein a first end of the bush is configured to be inserted into the housing and wherein the pushout surface is between the protruding portion and a second end of the bush, the second end being opposite the first end.

10. The bush according to claim 1 wherein the pushout surface comprises a recess for receiving the part of the protruding portion which moves onto the pushout surface.

11. The bush according to claim 10 wherein the recess is spaced from the protruding portion.

12. The bush according to claim 11 wherein the recess is longitudinally spaced from the protruding portion by a first distance and wherein a protruding portion length in the longitudinal direction is greater than the first distance.

13. The bush according to claim 1 wherein an outer anchor part length of the outer anchor part is 50 mm to 120 mm, measured in the longitudinal direction; and wherein a groove length of the circumferential groove is 2 mm to 12 mm, measured in the longitudinal direction.

14. The bush according to claim 1 wherein the circumferential groove is spaced from a first end of the bush and is spaced from a second end of the bush.

15. A bush for inserting into a housing, the bush comprising:

an outer anchor part having a tubular sidewall defining a bore;

an inner anchor part within the bore;

a first resilient portion extending between the outer anchor part and the inner anchor part and operably engaged with the outer anchor part and the inner anchor part to isolate vibrations therebetween;

a second resilient portion positioned along an outer surface of the sidewall before and after the bush is inserted into the housing and configured in use to contact the housing;

wherein the second resilient portion comprises a protruding portion which protrudes above the outer surface of the sidewall and is configured in use to contact the housing, wherein the outer surface of the sidewall comprises a pushout surface adjacent the protruding portion, wherein, before the bush is inserted into the housing, the pushout surface is exposed, wherein the second resilient portion is configured such that, when the bush is inserted into the housing, a part of the protruding portion moves onto the pushout surface such that a pushout force is exerted on the housing by the pushout surface via the part of the protruding portion, wherein the outer surface of the sidewall comprises a perimetrical groove extending in a perimetrical direction substantially perpendicular to a longitudinal direction around a perimeter of the outer anchor part and wherein the second resilient portion is disposed in the perimetrical groove, and wherein the perimetrical groove has a length in the perimetrical direction which is greater than a width of the perimetrical groove in the longitudinal direction.

16. The bush according to claim 15, comprising an intermediate resilient portion interposed between the first and second resilient portions, wherein the outer anchor part comprises an aperture extending through the sidewall, and the intermediate resilient portion extends through the aperture, and wherein the perimetrical groove comprises the aperture.

17. A method of manufacturing a bush for inserting into a housing, the method comprising the steps of:

providing an outer anchor part having a tubular sidewall defining a bore;

providing an inner anchor part within the bore;

providing one or more resilient materials to form:

a first resilient portion extending between the outer anchor part and the inner anchor part and operably engaged with the outer anchor part and the inner anchor part to isolate vibrations therebetween;

a second resilient portion positioned along an outer surface of the sidewall before and after the bush is inserted into the housing and configured in use to contact the housing;

wherein the second resilient portion comprises a protruding portion which protrudes above the outer surface of the sidewall and is configured in use to contact the housing, wherein the outer surface of the sidewall comprises a pushout surface adjacent the protruding portion wherein, before the bush is inserted, the pushout surface is exposed, wherein the second resilient portion is configured such that, when the bush is inserted into the housing, a part of the protruding portion moves onto the pushout surface such that a pushout force is exerted on the housing by the pushout surface via the part of the protruding portion, wherein the outer surface of the sidewall comprises a circumferential groove extending in a circumferential direction substantially perpendicular to a longitudinal direction around a circumference of the outer anchor part and wherein the second resilient portion is disposed in the circumferential groove, wherein the circumferential groove is recessed from the outer surface by a constant radial depth along a length of the circumferential groove in the circumferential direction, and wherein the sidewall comprises a first groove wall and a second groove wall that partially define the circumferential groove, the first groove wall and the second groove wall perpendicular to the longitudinal direction.

18. The method of manufacturing a bush according to claim 17, comprising the steps of:

providing an aperture extending through the sidewall such that the circumferential groove comprises the aperture; and providing one or more resilient materials to form an intermediate resilient portion interposed between the first and second resilient portions and extending through the aperture.

19. The method of manufacturing a bush according to claim 18 wherein the step of providing one or more resilient materials comprises:

inserting the one or more resilient materials between the inner anchor part and the outer anchor part such that the one or more resilient materials flow between the inner anchor part and the outer anchor part and through the aperture in the sidewall to form the first resilient portion, the intermediate resilient portion, and the second resilient portion.

20. The method of manufacturing a bush according to claim 19 wherein the step of providing one or more resilient materials comprises:

inserting a resilient material between the inner anchor part and the outer anchor part such that the resilient material flows between the inner anchor part and the outer anchor part and through the aperture in the sidewall to integrally form the first resilient portion, the intermediate resilient portion and the second resilient portion.

* * * * *